United States Patent

[11] 3,590,653

| [72] | Inventors | Hubert Dreckmann;<br>Charles B. Wilson, both of Michigan City, Ind. |
|---|---|---|
| [21] | Appl. No. | 183 |
| [22] | Filed | Jan. 2, 1970 |
| [45] | Patented | July 6, 1971 |
| [73] | Assignee | The Hays Corporation<br>Michigan City, Ind. |

[54] MEANS FOR TRIMMING THE POSITION OF CONTROL ELEMENTS
12 Claims, 4 Drawing Figs.

[52] U.S. Cl. ............................................. 74/425,
60/39,27, 74/63, 74/380
[51] Int. Cl. ......................................................... F16h 1/16,
F16h 35/00, F02c 9/04
[50] Field of Search............................................ 60/39.27;
74/425, 380, 388, 63

[56] References Cited
UNITED STATES PATENTS
3,141,348  7/1964  Dixon............................ 74/425

*Primary Examiner*—Leonard H. Gerin
*Attorney*—Oltsch & Knoblock

ABSTRACT: Means for trimming the position of a controlled element responsive to a power-actuated controller having a rotatable shaft for causing actuation of the controlled element. A housing member is journaled on the controller shaft and includes a part which is connected to the controlled element. The housing member has a shaft journaled thereto which is spaced from the controller shaft. Meshing gears interconnect the housing member shaft and the controller shaft. A power actuated unit is carried by the housing member and serves to rotate the housing member shaft. The degree of rotation of the housing member shaft is monitored by a signal device carried by the housing member.

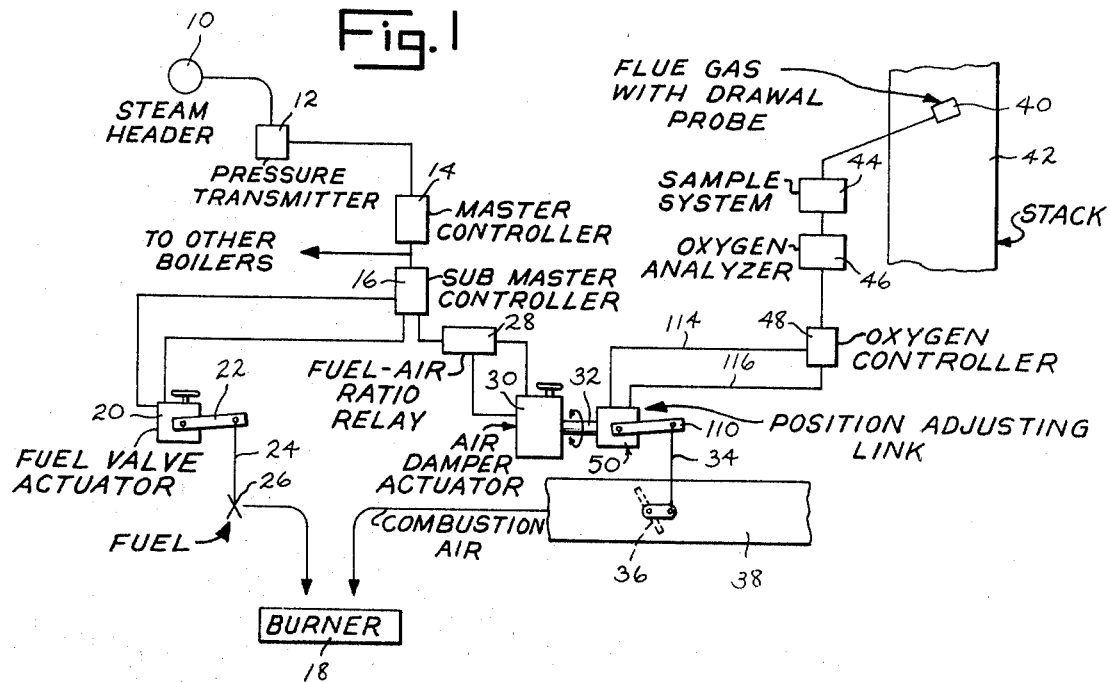
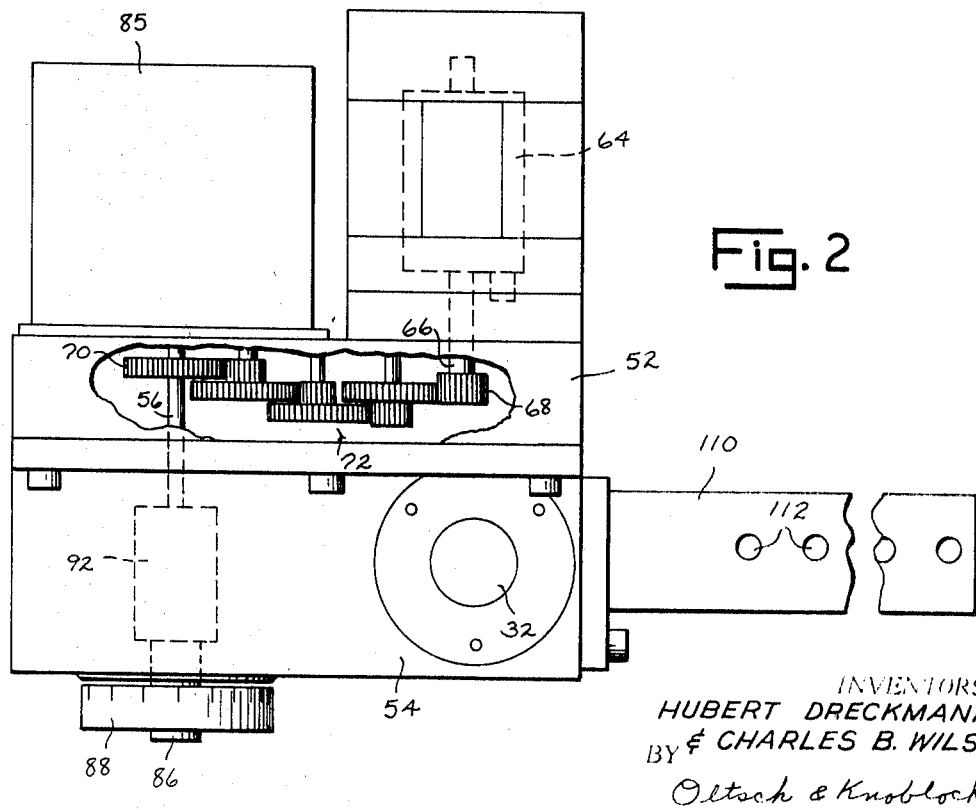

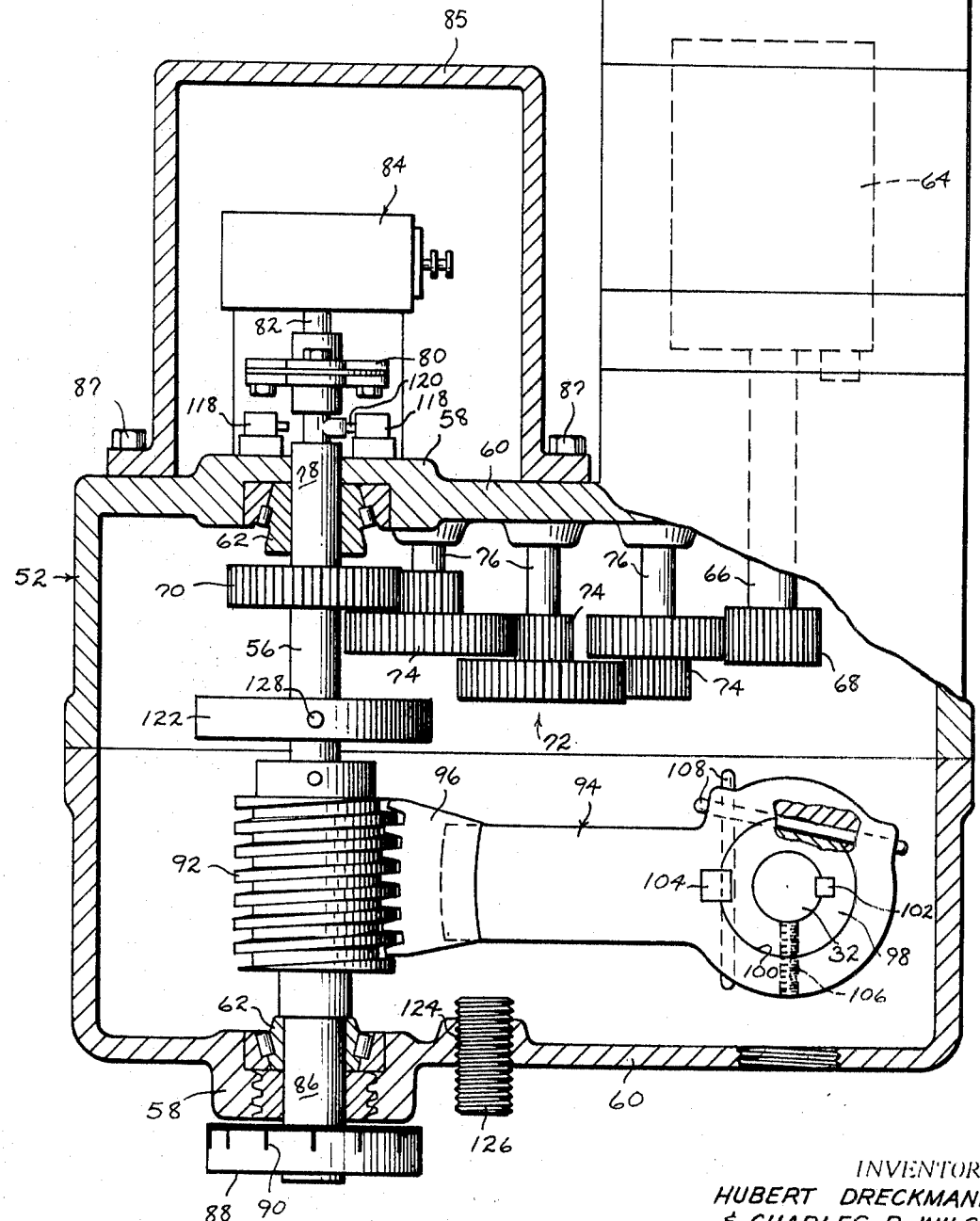

MEANS FOR TRIMMING THE POSITION OF CONTROL ELEMENTS

CROSS-REFERENCE TO A RELATED APPLICATION

This application is related to a commonly owned U.S. application Ser. No. 748,030, filed July 26, 1968, and constitutes an improvement thereto.

SUMMARY OF THE INVENTION

This invention relates to a means for trimming the position of controlled members. This invention will find its greatest utility in the combustion control systems but is also useful in control systems for vernier adjustment of positioning devices.

The position-trimming means of this invention is adapted for operable connection with a controlled element which is responsive to a power-actuated controller having a rotatable shaft for causing actuation of the controlled element. This invention includes a housing member which is adapted for journaling on the controller shaft and which includes a part connectable to the controlled element. The housing member includes a driven shaft journaled therein which is connectable to said controller shaft by meshing gear means. A power-actuated unit is carried by the housing member and is connected to the driven shaft to cause selected rotation thereof. Signal means responsive to the degree of rotation of the drive shaft is provided. The signal means and power actuated unit are adapted for connection to a controller which in response to a measured condition in the control system causes actuation of the power actuated unit with the signal means serving as a feed back medium to cause selected rotation of the drive shaft. Rotation of the drive shaft causes rotative movement of the housing member relative to the controller shaft and an adjustment of the controlled element connected to the housing member.

Switch means, operatively connected to the power actuated unit, it provided to limit the degree of rotation of the drive shaft. In addition to the switch means, mechanical stop means may be provided for limiting the rotational movement of the housing member relative to the controller shaft.

Accordingly, it is an object of this invention to provide means by which a controlled element responsive to a power-actuated controller in a system may be safely and accurately adjusted by small increments without interrupting the control of the controlled element by its power-actuated controller.

It is another object of this invention to provide a position-trimming means for a controlled element in a system in which the controlled element is primarily responsive to a first controller and secondarily responsive to a second controller.

Still another object of this invention is to provide a device which accommodates adjustment of the position of a controlled element primarily responsive to a master signal and which can be installed in existing control systems as well as systems under construction.

Other objects of this invention will become apparent upon a reading of the invention's description.

BRIEF DESCRIPTION OF THE DRAWINGS

FIG. 1 is a schematic view of a control system utilizing the position-trimming means of this invention.

FIG. 2 is a fragmentary view of the position-trimming means of this invention with parts thereof broken away for purposes of illustration.

FIG. 3 is an enlarged view of the position-trimming means illustrated in FIG. 1 with portions thereof removed for purposes of illustration.

DESCRIPTION OF THE PREFERRED EMBODIMENT

Figure 4:
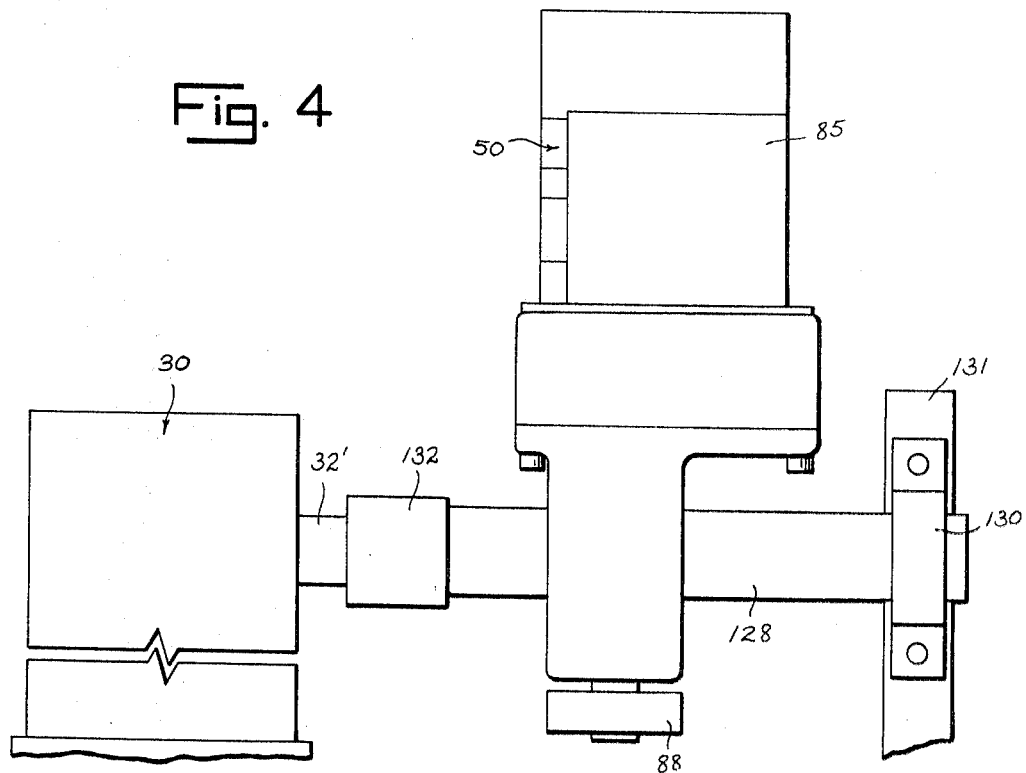
FIG. 4 is a view of the position-trimming means as seen from the left side of FIG. 2 and shown operatively connected in modified form to component parts of a control system.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

FIG. 1 is schematically illustrative of the position trimming means of this invention being used in a combustion system for a boiler. The steam pressure within the steam header 10 of the boiler may be monitored by a pressure transmitter 12 which in response to a specific pressure variation from a pressure norm actuates a master controller 14. Master controller 14 may be operatively connected to one or more submaster controllers 16 (only one shown) each serving to regulate a combustion burner 18. Submaster controller 16 may be connected to a power-operated reversible positioning unit or fuel valve actuator 20 having an adjustable member 22 connected by a link 24 to a fuel valve 26 which regulates the fuel rate to burner 18. Submaster controller 16 is also connected to a fuel/air ratio relay 28 which in turn is operatively connected to an air damper actuator or power-actuated controller 30. Actuator 30 is reversible and includes a rotatable shaft 32 which is interconnected by suitable linkage 34 to a damper 36 positioned in the combustion air supply conduit 38 of the combustion system. A gas-withdrawl probe 40 is positioned in flue gas stack 42 which is connected to burner 18. Probe 40 constitutes a part of a gas sample system 44 which serves to supply a sample of the flue gas to an oxygen analyzer 46. Oxygen analyzer 46 is operatively connected to a controller 48. Controller 48 is operatively connected to the position trimming device or means 50 of this invention.

One embodiment of the position-trimming means 50 of this invention is illustrated in FIGS. 2 and 3. Trimming means 50 includes a housing 52 which is shown journaled on shaft 32 of actuator 30. Shaft 32 preferably extends through housing 52 making bearing-supporting contact with opposite sidewalls 54 (one only shown) of the housing. A driven shaft 56, spaced laterally from and extending transversely to the axis of shaft 32, is carried by housing 52. The end portions of shaft 56 extend through hub parts 58 in upper and lower sidewalls 60 of housing 52 and are journaled therein by bearing members 62.

A reversible motor or power-actuated unit 64 is carried by housing 52 and is connected to shaft 56 so as to cause selected rotation thereof. The drive shaft 66 of motor 64 has a pinion gear 68 mounted thereto. Motor 64 preferably includes a self-applying brake which prevents rotation of its drive shaft whenever the motor is deactivated. Gear 68 is drive connected to a spur gear 70 mounted to shaft 56 through a speed reducer gear train 72 which comprises a plurality of intermeshing spur and pinion combination gears 74. Each combination gear 74 is journaled about a support shaft 76 anchored to the upper sidewall 60 of housing 52. One end portion 78 of shaft 52 projects outwardly from upper sidewall 60 of housing 52 and is interconnected by a flexible coupling 80 to the actuator member 82 of a signal means or device 84, such as a potentiometer. Signal device 84 is anchored to housing 52 and is preferably enclosed by a cover 85 mounted by bolts 87 to the housing. Actuator member 82 rotates with shaft 56 and in doing so varies the signal output of signal device 84 and is indicative of the degree of turn of shaft 56 relative to a predetermined reference position. Opposite end portion 86 of shaft 56 protrudes outwardly from the lower sidewall 60 of housing 52 and has a disc-shaped indicator 88 coaxially mounted thereon. Indicator 88 has spaced vernier markings 90 positioned about its outer margin. A reference line or mark (not shown) is formed on lower side wall 60 adjacent the indicator margin to enable one to tell the rotational position of shaft 56 from markings 90 on indicator 88.

Meshing gear means are disposed within a housing 52 to connect shaft 56 with actuator shaft 32. Such gear means preferably includes a worm gear 92 carried on shaft 56 and a rigid arm member 94 fixedly mounted at one end to that portion of shaft 32 extending into housing 52. The free end of arm member 94 includes a gear sector 96 which meshes with worm gear 92. Arm member 94 is shiftable in a pivot plane about the axis of shaft 32 and includes an adapter part 98 which snugly encircles shaft 32 and which is snugly received within a bore 100 in the arm member. Adapter part 98 is fixed to shaft 32 by key 102 and is fixed to the receiving portion of arm member 94 by key 104. In each control system installation an adapter part 98 is provided to accommodate a particular sized actuator shaft 32, thus enabling the same gear sectored part of the arm member to be used in the various installations. Adapter part 98 is preferably additionally anchored to shaft 32 and arm member 94 by setscrew 106 which is threaded into the arm member and the adapter part and is seated against the shaft and by pins 108 which extend in a press fit through registering bores in the arm member and the adapter part as shown in FIG. 3. The use of setscrew 106 and pins 108 eliminates play between arm member 94 and shaft 32, thus contributing to the accuracy and sensitivity of this invention. Additionally, there is preferably a close intermesh between the teeth of worm gear 92 and the teeth of gear sector 96 of arm member 94 so as to substantially eliminate free play between the worm gear and the arm member. The worm gear and arm interengagement prevents rotation of shaft 32 relative to housing 52 unless drive shaft 56 is turned.

Housing 52 includes a rigid arm part 110 which extends laterally outwardly of the pivotal axis of housing 52 as illustrated in FIG. 2. Linkage 34, which is connected at one end to damper 36, has its opposite end pivotally connected to arm 110. Arm 110 preferably has a plurality of apertures 112 formed therein to accommodate various types of connections with control elements in different control system installations.

In operation, position trimming means 50 operates as follows. When air damper actuator 30 causes rotation of shaft 32, housing 52 rotates with shaft 32 due to the interengagement of worm gear 92 and arm member 94, thereby causing pivotal movement of arm 110 and movement of damper 36 through interconnecting linkage 34. Activation of motor 64 causes rotation of shaft 56 and relative movement between worm gear 92 and arm member 94 so as to cause pivotal movement of housing 52 about shaft 32 and an adjustment of damper 36. It is to be understood that shaft 32 need not be stationary during the activation of motor 64 but that air damper actuator 32 and motor 64 can be simultaneously activated to cause a movement of arm 110 and an adjustment of damper 36 which is the resultant of the rotational displacement of shaft 32 as determined by the activation of actuator 30 and the relative movement of housing 52 as determined by activation of motor 64.

Submaster controller 16, through information received from pressure transmitter 12 and master controller 14, activates actuator 20 to cause adjustment of fuel valve 26 and actuator 30 to cause the adjustment of damper 36, thereby controlling the flow rate of fuel and combustion air into burner 18. Sample system 44 and analyzer 46 serve to monitor the excess air in the flue gases passing through stack 42. This information is relayed to oxygen controller 48 which activates motor 64 whenever the excess air in the flue gas either exceeds a specific high limit or drops below a specific low limit. Motor 64 serves to selectively rotate shaft 56, causing relative rotation of housing 52 about shaft 32 and the incremental adjustment of damper 36 independently of submaster controller 16.

Oxygen controller 48 is connected to motor 64 by line 114. Signal device 84 is connected to oxygen controller 48 by line 116 and serves to send a feedback signal to the controller which enables the controller to sense and correct the position of shaft 56 in response to the data it receives from oxygen analyzer 46. Spaced electrical limit switches 118 may be mounted to housing 52 adjacent one end portion, preferably end portion 78, of shaft 56. Switches 118 are connected to motor 64 and serve to deactivate the motor when tripped. A trip 120 is mounted to the same end portion of shaft 56 and is adapted to swing between switches 118 during normal operation to position trimming means 50 and to engage and trip a switch when a selected maximum degree of shaft rotation takes place, thereby deactivating motor 64. Flexible coupling 80 serves to accommodate any misalignment between actuator member 82 of signal device 84 and upper end portion 78 of shaft 56 and to provide a rigid connection between shaft 56 and device 84 so as to increase the accuracy and sensitivity of the control system.

It is also preferable to provide the position-trimming means of this invention with mechanical stop means in addition to limit switches 118. This mechanical stop means may include a collar member 122 which encircles shaft 56 and which is fixedly positioned by setscrew 128 between worm gear 92 and spur gear 70. Collar member 122 includes an outer peripheral margin which extends into the path of swing of arm member 94. Lower sidewall 60 of housing 52 preferably includes a threaded bore 124 having a bolt member 126 threaded therein. Bolt member 126 projects into housing 52 and is positioned adjacent the opposite side edge of arm member 94 from collar member 122 and within the path of swing of the arm member. Bolt member 126 may be turned to vary the spacing between the bolt member and collar member 122 and thus vary the amount of swing of arm member 94.

FIG. 4 is illustrative of a means of connecting position-trimming means 50 to a short output shaft 32' of actuator 30. Trimming means 50 is journaled on a coupler shaft 128 which extends through housing 52 and is secured to arm member 94 of the trimming means by adapter 98. One end portion of shaft 128 is journaled in an outboard bearing member 130 which is mounted to a support 131, and the opposite end portion of shaft 128 is coaxially joined to shaft 32' by a coupler 132. Arm 110 of trimming means 50 may be connected to a control member, such as damper 36 shown in FIG. 1.

An important consideration is that position trimming means 50 can be connected to any existing control system, thus rendering the device readily installable in existing systems as well as systems originally designed and constructed to include it. Additionally, the device of this invention is not limited to use in a combustion control system but may be used in any control system having controlled element which is responsive to a power actuated controller having a rotatable shaft for actuating the controlled element.

It is to be understood that the invention is not to be limited to the details herein given but may be modified within the scope of the appended claims.

What we claim is:

1. Position-trimming means adapted for operable connection with a controlled element responsive to a power-actuated controller having a rotatable shaft for actuating said controlled element comprising:
   a housing member adapted for journaling on said controller shaft and including a part connectable to said controlled element,
   a driven shaft journaled in said housing member,
   meshing gear means having one part carried by said driven shaft and having another part connectable to said controller shaft,
   a power-actuated unit carried by said housing member connected to said driven shaft to impart rotation thereto, and
   signal means responsive to the rotative position of said driven shaft relative to the housing member.

2. The construction of claim 1, wherein said power-actuated unit includes a drive shaft spaced from said driven shaft and operatively connected thereto by gearing, one end portion of said driven shaft having said signal means connected thereto.

3. The construction of claim 2, including limit switch means electrically connected to said power-actuated unit to cause deactivation of said unit when tripped, said switch means being mounted to said housing member adjacent said driven shaft, said driven shaft carrying a switch tripping part operatively engageable with said switch means upon selected rotational movement of said driven shaft.

4. The construction of claim 2, wherein said signal means includes an actuator member, a flexible coupling connecting said driven shaft end portion to said signal means actuator member.

5. The construction of claim 1, wherein said gear means includes a worm gear carried on said driven shaft and a pivot arm having one end adapted for attachment to said controller shaft and its other end comprising a gear sector interengaging with said worm gear.

6. The construction of claim 5, including first stop means mounted to said housing member and positioned within the path of swing of said arm.

7. The construction of claim 6, including second stop means carried by said driven shaft and positioned within the path of swing of said arm, said first and second stop means being located on opposite sides of said arm.

8. The construction of claim 7, wherein one of said stop means is shiftable so as to vary the amount of swing of said arm.

9. The construction of claim 5, wherein said arm has a bore formed therein and includes an adapter received within said bore, said adapter having a bore to receive said controller shaft and being securable to both said arm and said controller shaft.

10. The construction of claim 9, wherein said arm and adapter have registering passages formed therein, a lock pin pressed into said registering passages to secure said adapter to said arm.

11. The construction of claim 10, and including screw means threaded through said arm and adapter adapted to engage said controller shaft for securing said adapter to said arm and controller shaft.

12. The construction of claim 1, and including means mounted to said driven shaft externally of said housing for indicating the degree of rotation of said driven shaft.